(No Model.)
A. H., F. J. & H. S. HUMPHREY.
WATER HEATER.
No. 523,071. Patented July 17, 1894.
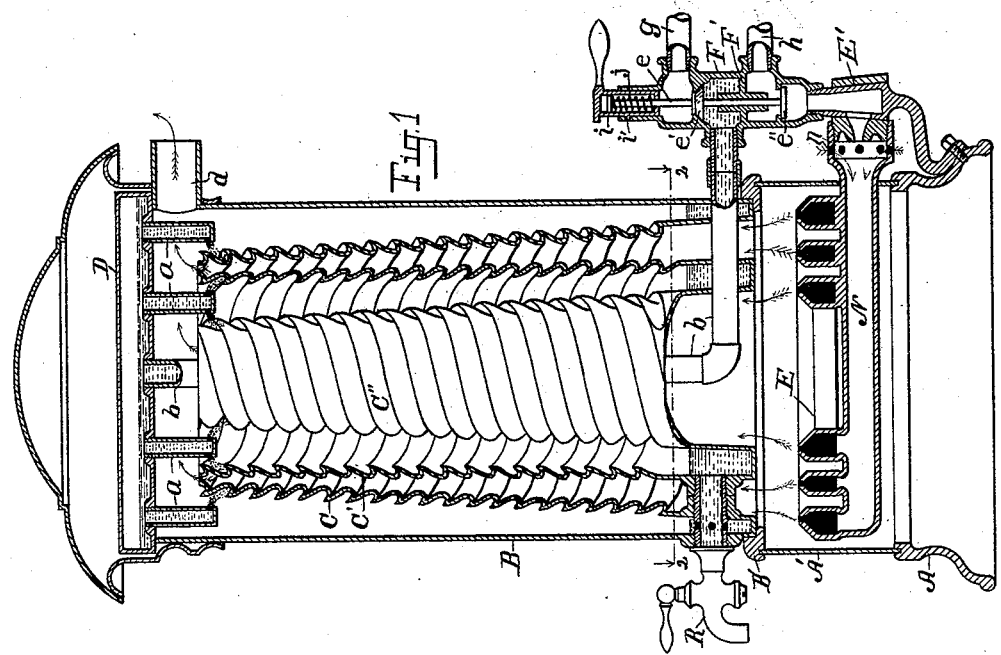
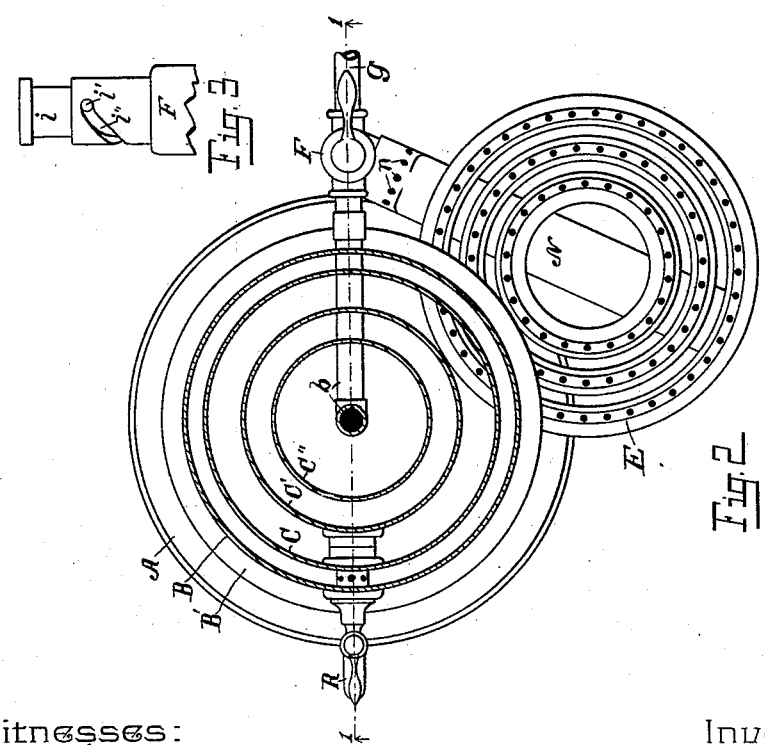
Witnesses:
Walter S. Wood
C. E. Westbrook
Inventors
Alfred H. Humphrey, Fred J. Humphrey
and Hubert S. Humphrey
By Fred L. Chappell
Att'y.

UNITED STATES PATENT OFFICE.

ALFRED H. HUMPHREY, FREDERICK J. HUMPHREY, AND HERBERT S. HUMPHREY, OF KALAMAZOO, MICHIGAN.

WATER-HEATER.

SPECIFICATION forming part of Letters Patent No. 523,071, dated July 17, 1894.

Application filed December 4, 1893. Serial No. 492,805. (No model.)

*To all whom it may concern:*

Be it known that we, ALFRED H. HUMPHREY, FREDERICK J. HUMPHREY, and HERBERT S. HUMPHREY, citizens of the United States, residing at the city of Kalamazoo, in the county of Kalamazoo and State of Michigan, have invented certain new and useful Improvements in Water-Heaters, of which the following is a specification.

Our invention relates to water heaters, and more particularly to that class of water heaters used in bath rooms or barber shops for heating water in a very short time, though, our invention is so effective and utilizes the heat so perfectly, that it is of advantage to use it for heating larger quantities of water, than would be required for these purposes.

The objects of our invention are: first to provide a water heater that shall utilize all the heat of the fuel consumed; second to provide certain means of distributing water thinly and evenly over an extensive surface for the purpose of getting the full benefit of heat applied; third, to provide a water heater using gas as a fuel, that can be adjusted to any pressure of water, or to heat the water to a fixed temperature in passing through the heater. We accomplish these objects by the mechanism shown in the accompanying drawings, in which—

Figure 1 shows a vertical central sectional view of our invention on line 1—1 of Fig. 2. Fig. 2 is a horizontal sectional view on line 2—2 of Fig. 1, looking down, the gas burner being drawn out of the heater. Fig. 3 is a detail of the adjusting device for adjusting the apparatus to different pressures of water and gas, and for adjusting the device to heat water to different temperatures.

Similar letters of reference refer to similar parts throughout the several views.

Referring to the drawings, A is the base of our improved heater. Supported on this base is the lower casing A' for inclosing the sides of the burner chamber, one side of which is adapted to open, to permit the burner E to be withdrawn for cleaning or lighting as desired.

Upon the casing A' rests a circular casting B' which supports all the upper part of the heater and affords means of attaching a part of the mechanism.

B is the outside casing bearing an ornamental top which incloses the upper part of the heater. This outside casing and top can be ornamented and finished to suit the taste of the user. Inside of this case are three concentric conical tubes or walls C, C' and C'', over which water passes on one side and heat on the other. The tubes are constructed of thin sheet metal which is indented into spiral grooves, the inner part of the grooves being a little lower than the outside, so that water will be retained and pass down as in a channel or channels around the tubes, for, three or four of these spiral grooves are usually made parallel to each other around each tube. On the tube C' the indentations are from the inside out, but otherwise are as described, the water passing down on the inside of this tube and the heat up on the outside. The bottoms of tubes C' and C'' are united together forming an annular chamber between them. The outer tube C is united at the bottom to the outside casing B, forming another annular chamber. The top of these chambers we illustrate as open, but they could be closed where it is desired to fill them full of water and it would prevent an overflow; but, as our heater will not be used frequently in this way these chambers will usually be left open. Between these water chambers up between tubes C and C' and up the central part of tube C'', open spaces are left from top to bottom for the passage of the flames and heated gases from the burner or fuel below.

The water pipe b passes into the feeder above the casting B' to the center of tube C'' then straight up the center to a broad hollow water disk D over the whole top. Short pipes a, a, project down into the water chambers and deliver the water through apertures onto the sides of the tubes, so that it will be taken up by the grooves and carried around them. When the water passes down to the bottom of the water chambers it is delivered to the outside through stop cock R.

The burner E is made up of three concentric hollow rings perforated at the top to allow the gas to escape and opening into pipe N below. The pipe N terminates in a collar which is adapted to rotate on a bearing E and so make it possible to withdraw the burner E from the heater. The usual perforations $n$ are made in pipe N to admit air. Air also passes freely up between the concentric rings of the burner E.

When the burner E is lighted and moved into the heater it causes heated air and gases to pass up between tubes C and C' and through the center of tube C'' out at the top, against the water disk D, out at the side of the heater through pipe $d$. This of course heats the water passing down. The corrugations on the side of the tube next the heat retain the heated gases, and prevent them passing too rapidly to thoroughly give up all their heat.

Our heater is connected to a gas pipe $h$ and water pipe $g$ by our improved automatic regulating device. F is the outer shell and main body of this device. A partition F' separates this shell into two valve chambers. The upper one is for water, and the lower one is for gas. A valve stem $e$ passes through both valves and operates them together, and projects out at the top, and terminates in a disk against which a spring $j$ acts to hold the valves $e'$ and $e''$ against their respective seats. The spring $j$ is held in a case $i$ which fits into the top of the cases E. The case $i$ is adjustable up and down by turning the handle attached thereto, which moves the pin $i'$ in the spiral slot $i''$. This will be seen to put stress on the spring $j$ and consequently hold the valves with varying pressure against the seats.

To put our improved heater in operation a stop cock is opened in pipe $g$ which allows water to pass into the upper valve chamber, when its pressure depresses the valve, which allows the water to pass into pipe $b$ on into the heater. When this water opens the water valve it also opens the valve $e'$ to the gas pipe $h$, for, it is attached to the same stem $e$ and must move with it. Thus it will be seen that the relative amount of water and gas can be controlled by tightening the spring $j$, and that when the water supply and its consequent pressure cease, the gas will also be shut off and any heating of the heater without water inside will be prevented. As the heating of the parts is objectionable without water, the advantage of this device is apparent; because as soon as the water for any cause ceases to flow, the gas valve closes.

By putting tension on spring $j$ there will only a small amount of water pass the valve, which will be heated more than when a large amount is allowed to pass, so, adjusting the spring by controlling the amount of water which passes also controls the temperature to which the water is warmed.

We desire to say that our device can be considerably modified and still embody our invention; a single tube C made as we have indicated will be effective to a remarkable degree.

If the corrugations are not spiral but merely circular and are shaped as we have indicated, they will hold water, and it can be made to over flow from one to the other, and cause it to be distributed but so much will be retained on the tube, that it is inferior to the device as shown in the drawings where the grooves are spiral.

Our improved gas controlling device and regulator can be used on any of the devices of this class. Any other heating device than the burner E might be utilized with our improved grooved tubes.

Having thus described our invention, what we claim as new, and desire to secure by Letters Patent, is—

1. In a water heater, the combination with the base A, the burner chamber A', and the upper casing B; of a suitable burner E in the burner chamber; the central water pipe $b$; the water disk D; the descending delivery pipes $a$, $a$, from the water disk; the concentric tubes C, C', and C'' with trough shaped corrugations, adapted to receive water on one side and the upwardly passing heat from the burner on the other side; the delivery cock R for drawing off the water; and the valves $e'$, $e''$ in separate chambers united by a single valve stem, and held to place by spring $j$, all substantially as described for the purpose specified.

2. In a water heater, the combination with a suitable heating apparatus below, of the casing, B, the tubes, C, C', C'', with spiral trough shaped corrugations sloping down toward the wall of the tubes to retain the water and carry it around said tubes, said tubes forming annular concentric chambers, the delivery pipe for the water at the top of the tubes in said chamber and open passages for the passage of heat, for the purpose specified.

3. In a water heater, the combination of a tube with spiral trough shaped grooves adapted to receive the water at the top and convey it in said spiral trough shaped grooves down the tubes; and a suitable heater to heat the walls of the tube opposite the passing water, for the purpose specified.

4. In a water heater, the combination of concentric tubes, C, C', C'', forming concentric chambers being for the upward passage of heat and the downward passage of water, the said tubes being spirally corrugated, the said corrugations being trough shaped to retain water on their upper surfaces and convey it around said tubes so that it shall become thoroughly heated, and suitable means of carrying heat through the said chambers, for the purpose specified.

5. In a water heater, the tube with parallel, spiral trough shaped corrugations like a double or triple threaded screw, dished on their upper sides to retain the water and carry it spirally around said tubes, and a suitable heater for heating the opposite side of the wall of said tube to heat the water as it passes down, for the purpose specified.

6. In a water heater, a tube of sheet metal with trough shaped corrugations for retaining and distributing the water upon one side and retarding the passage of heat on the other, for the purpose specified.

7. In a water heater, a tube with spiral trough shaped corrugations upon its surface to distribute and retard the passage of water over it, and suitable means of heating the tube, for the purpose specified.

8. In a water heater, a tube of sheet metal with spiral trough shaped corrugations for the purpose of distributing and retaining the water upon its surface and retarding the passage of heat upon its opposite surface so that the water shall become heated in passing, for the purpose specified.

9. In a water heater, a vertical sheet metal tube with spiral, trough shaped corrugations, a delivering pipe to deliver the water upon one surface of said tube so that it shall be distributed and carried evenly over the surface thereof, and a suitable heater to heat the opposite side of said tube, the corrugations being adapted to retain and retard the passage of the heated gases so that the heat shall be thoroughly utilized in the water heater, for the purpose specified.

In witness whereof we have hereunto set our hands and seals in the presence of two witnesses.

ALFRED H. HUMPHREY. [L. S.]
FREDERICK J. HUMPHREY. [L. S.]
HERBERT S. HUMPHREY. [L. S.]

Witnesses:
E. S. ROOS,
FRED L. CHAPPELL.